United States Patent [19]

Ceseri

[11] 4,023,017

[45] May 10, 1977

[54] ELECTRONIC TRAFFIC CONTROL SYSTEM

[75] Inventor: Pierluigi Ceseri, Florence, Italy

[73] Assignee: Autostrade, S.p.A., Rome, Italy

[22] Filed: May 21, 1975

[21] Appl. No.: 579,405

[30] Foreign Application Priority Data

May 28, 1974 Italy .............................. 51264/74

[52] U.S. Cl. ..................... 235/150.24; 235/150.27; 340/32; 340/38 R; 343/7 VC

[51] Int. Cl.[2] ........................................ G06F 15/48

[58] Field of Search ..... 235/150.2, 150.24, 150.27; 325/117, 312, 314; 340/32, 38 R, 172.5; 343/7 A, 7 VC, 7 VM, 112 C

[56] References Cited

UNITED STATES PATENTS

| | | | |
|---|---|---|---|
| 3,182,312 | 5/1965 | Daniels | 343/7 VC |
| 3,195,126 | 7/1965 | Barker | 343/7 VC |
| 3,406,395 | 10/1968 | Zupanick | 235/150.24 X |
| 3,516,056 | 6/1970 | Matthews | 340/38 R |
| 3,536,900 | 10/1970 | Iwamoto et al. | 235/150.24 |
| 3,626,413 | 12/1971 | Zachmann | 235/150.24 X |
| 3,899,671 | 8/1975 | Stover | 235/150.2 |

FOREIGN PATENTS OR APPLICATIONS

| | | | |
|---|---|---|---|
| 1,516,590 | 10/1969 | Germany | 340/32 |
| 1,914,917 | 10/1970 | Germany | 340/38 |

*Primary Examiner*—R. Stephen Dildine, Jr.

[57] ABSTRACT

A traffic control system having a number of detectors spaced along a roadway being monitored. The detectors are organized in groups, each group being interconnected to a different post. The posts include transmission and reception equipment for communicating with the detectors of that group. A transmission line system has a number of sections with a single section corresponding respectively to a single group of detectors. The sections of the transmission line system are also respectively coupled to the posts. The posts are also organized into groups, each group being interconnected to a control computer. All the control computers are connected to a central computer and an operating center. The various computers can be set to control the traffic in response to the information detected. Also, communications can be carried out, both in code and in clear, between the vehicles using the roadway and the computers or the operating center.

24 Claims, 5 Drawing Figures

ELECTRONIC TRAFFIC CONTROL SYSTEM

There are known traffic control systems, particularly for the detection of accidents along a monitored roadway, based on the use of inductive loops which are buried transverse to the road section and are spaced a few hundred meters from each other. With such systems any eventual accident or any other abnormal situation relating to road traffic is signalled to an operating center by the detection of the tail end of a column connected to the last loop which the damaged car crosses before its stop.

In such systems the time necessary for the detection of an accident depends on the distance between the inductive loops, as well on the number of vehicles involved in the accident, the speed and the traffic intensity. By reducing the distance between adjacent loops, the response time is reduced, but this necessitates a larger number of loops needed for the same roadway, consequently, a greater cost of apparatus without, however, obtaining continuous and immediate control of the traffic conditions.

Furthermore, due to the fact that the loops must be buried transversally to the road, such control systems are restricted, in the sense that eventual adjustment of the apparatus according to changed working conditions require expensive works and requires the interruption of traffic during the time needed for the removal of the existing devices and replacing them by the new ones. For the same reason, running expenses are substantial due to the fact that tracks, road settlements, remaking of the worn road covering and regular upkeep of the road all cause strain on the loops' wire, which determines and makes necessary frequent replacements of the loops themselves.

The said inconveniences do not effect those known systems based on the use of doppler radars. However, these systems require installation of poles, which implies an enlargement of the detection area and, consequently, a reduction in discrimination of the counting of the vehicles and other traffic phenomena.

Furthermore, the use of a doppler radar is much more expensive than the use of inductive loops, even though it allows a certain increase in the spacing of the detector stations without causing a substantial increase in the response in time.

Experience has shown that the said known systems do not permit obtaining satisfactory results, especially with respect to the essential need of assuring timely assistance.

This invention concerns an improved system for an electronic traffic control in real time along a monitored roadway, such as a roadway which can provide in a simple, practical and economic way the following features and objects.

One object of the invention is to provide a continuous detection of the traffic parameters in each section in which the roadway has been subdivided, and the simultaneous detection of the meteorological conditions in at least one section of the given roadway.

Another object of the invention is to provide an electronic analysis of the data concerning the traffic speed, density, flow and distribution, and predict changes in the speed and density with respect to time and space, for each section along the monitored roadway in view of the morphological characteristics of the road (outline, width and lay-out) and of the surrounding meteorological conditions.

Still another object of the present invention is to evaluate the difference between the detected data and the predicted data and carry-out alarm procedures when the differences are in excess of threshold values by automatically activating and controlling visual displays, like traffic lights, variable warning panels and so on, as well as by signalling to the vehicles travelling on the roadway. The vehicles are thus provided with special receiving and/or transmitting sets which respond to code messages and activate optical-acoustic instruments on board. Standard pre-recorded code messages can also be automatically transmitted in clear to the vehicles as well as particular messages transmitted from an operating center as well as a control center.

Yet another object of the present invention is the transmission from mobile units to the operating center of code messages which identify the vehicle, the request for assistance and so on.

Another object of the present invention is the bidirectional communication in clear between the mobile units and the operating center and/or the control center.

Another object of the present invention is the transmission from determined posts on the ground of code messages by pushing a button, the code messages containing elementary operating instructions, like the request for assistance.

Still a further object of this present invention is the memorization of the detected data and of the operations performed as well as the detection of the failures of the principal components of the entire apparatus and of each subapparatus.

The improved system of the present invention, therefore, provides an efficient traffic control in real time to thereby increase the safety and the efficiency on the roads monitored by it.

From the standpoint of safety, it allows an immediate detection of accidents and/or of other abnormal situations of danger, like those depending on unfavorable meteorological conditions such as poor visibility, rain, snow, icing, wind velocity and so on. It supplies to the users timely optical and acoustical warning information and the possibility to call for assistance, in clear or in code, without leaving their vehicles.

On the other hand, increase of the degree of efficiency is realized through interventions operated preferably by the control center and directed to regulate the traffic along the stretch of the roadway whenever traffic density nears the saturation limit and vehicular flow tends to become chaotic due to disturbances caused by the users or by other contingent situations.

The same system, as stated above, allows a continuous connection in clear, between a central unit, like the operating center, and the vehicles running on the monitored roadway and provided with a receiving radio set the connection can be used not only for communications concerning abnormal traffic conditions or emergency services but also for transmitting any network program, like music, news, commercial programs and so on, with complete elimination of disturbances and of fading areas due to the location of the broadcasting or repeating stations and due to surrounding meteorological conditions, including tunnels.

Connection can also be realized in the opposite direction, that is from the vehicle to the center, with the identical operating characteristics, even under the most unfavorable topographical and meteorological conditions.

Further advantages and characteristics of the present invention will be apparent from the following specification and attached drawings, in which are shown illustrative but non-limiting embodiments.

Figure 1:
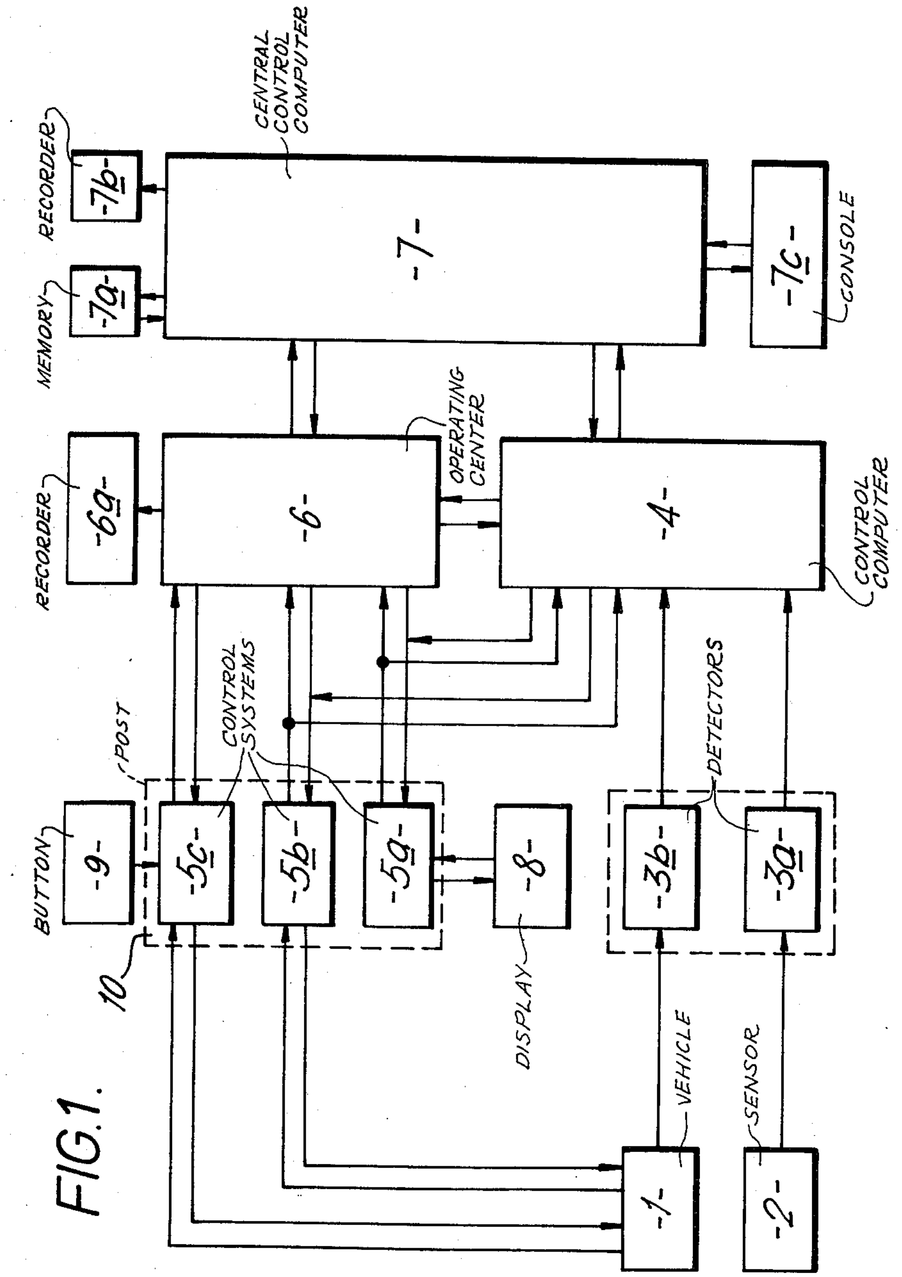
FIG. 1 shows a block diagram of the improved system for the electronic traffic control in accordance with the present invention.

The block diagram of FIG. 1 shows a double system of detectors 3*a* and 3*a*, placed along the controlled stretch of roadway, capable of receiving continuous information concerning, respectively, the transit of vehicle 1 and the meteorological conditions through sensor 2, transmitting them to a control computer 4.

The single detecting posts 3*a* and 3*b* are interrogated by the control computer at intervals so as to allow, according to the sampling theory, the reconstruction of the functions of the parameters with respect to time for each section, and with respect to space along the roadway.

The control computer 4 records and decodes all received signals, and processes a first assortment of the data for a verification of the traffic flow condition. Based on instructions received from the computer control center 7, it evaluates the traffic forecast for each section, detects the differences between the measured parameters and the forecast parameters. When the differences exceed threshold values fixed by the program of the computer, it carries out an alarm procedure, to automatically operate by means of the control system 5*a*, the visual displays 8 which can include traffic lights and/or variable warning panels. The visual displays are placed at strategic points of the roadway. The control computer also transmits to the operating center 6 and to the computer control center 7 a specific message.

In the same instances where the threshold values are exceeded, jointly or alternatively to the carrying out of the visual displays, the control computer 4, by means of the system 5*b*, transmits automatically to the vehicles in transit or at a standstill along a portion of monitored roadway, code messages on an established frequency. The code messages activate the optical-acoustic signals on devices provided on board of the vehicles 1. Simultaneously the information is also transmitted to the operating center 6 and the central computer 7.

The central computer 7 records in its mass-memory 7*a* the messages of the detected events and when it is foreseen by the program it predisposes the transmission in clear on the interested roadway, through the system 5*c*, of pre-recorded and codified standard warning messages.

Furthermore, from the console of the operating center 6 it is possible, by means of the operator's intervention, to transmit to the users, both in code and in clear, particular messages not foreseen by the central computer 7, and/or to activate manually visual displays 8 and/or to transmit or retransmit, on the system frequency, network programs such as music, news, commercial programs and so on, with elimination of disturbances and/or of fading areas.

There are provided two channels that modulate alternatively the same carrier $f_1$. Either one of the two channels is reserved for the transmission or retransmission of network programs, while the other channel is used for the transmission of traffic messages. The switching between the two channels is controlled automatically by the control center 7 through the computer 4 on the basis of the general program, or manually on request of the operating center 6.

The connection between vehicles 1 and the operating center 6 is bi-directional, in code through system 5*b* and in clear through system 5*c*.

In practice, nothing prevents the transmission in code in both directions to all users to allow the sending out of elementary messages, the identification of the vehicle, the request for assistance and so on. The connection in clear, on the other hand, is advantageously extended to everybody in only one direction from the center towards the users. In the direction from the vehicles towards the center, it is reserved for service and/or authorized vehicles.

Furthermore, the posts 10, located by the road-edges, to which converge systems 5*a*, 5*b* and 5*c* of each elementary stretch 11 of the network which form the control system object of the present invention, are provided with a manually operated device 9 (i.e. a button) that, by utilizing a part of the channel in clear, allows the transmission of code messages for the achievement of elementary instructions, for example, a request for assistance, in the direction toward the operating center 6.

Finally, it is foreseen that all of the instructions given automatically and/or manually and all the results of the detected data, are recorded in 6*a* and 7*b*, respectively, by the operating center 6 and the control center 7, in order to control running and forming a file of all events for statistic, administrative and legal purposes.

In 7*c* is shown the console of the above mentioned control center 7 from which it is possible to intervene into the system independently of the pre-established general program.

The detecting of the parameters of interest takes place through a plurality of detecting stations 12 placed along the road at predetermined intervals and suitable for giving indications about the presence of vehicles and the length of their stay in the controlled area, their number, size and speed.

Figure 2:
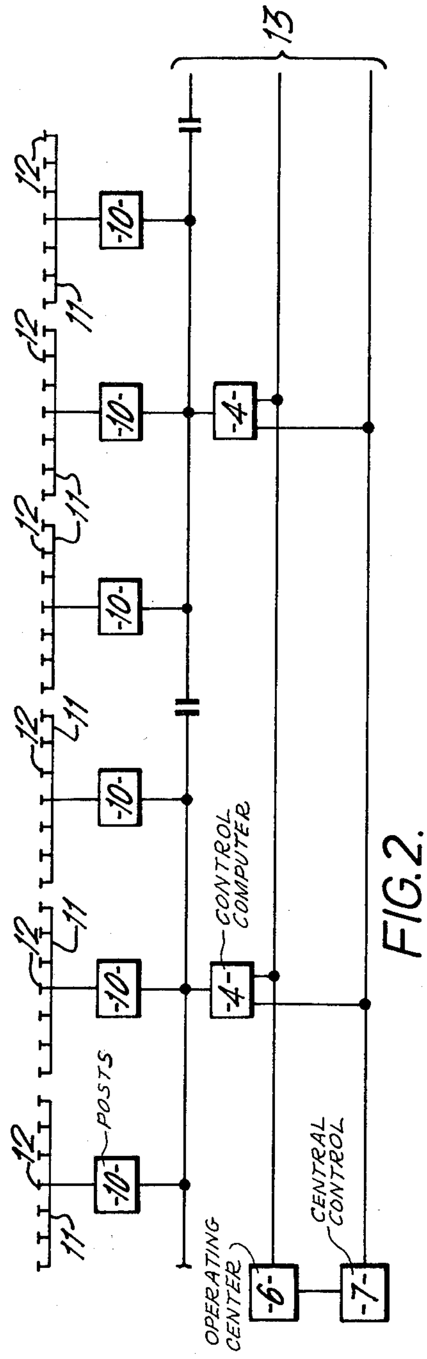
FIG. 2 shows a lay-out of the installations along a roadway so equipped with the system of FIG. 1.

As already mentioned, and as FIG. 2 shows, the control system, is subdivided in elementary stretches 11, having variable length, preferably but not exclusively from 2 to 8 kilometers, comprising a certain number of detecting stations 12 connected to a post 10, for example a locker containing the devices which form the systems 5*a*, 5*b*, 5*c* and for the detection of the meteorological conditions from sensors 2, as well as the button 9.

The location of each post 10 is preferably in an intermediate position of the elementary stretch 11.

The posts 10 corresponding to a certain number of the elementary stretches 11, preferably but not exclusively from four to six posts 10, are connected through channels supported by a standard telephonic line 13 to a control computer 4, in turn connected with the operating center 6 and the control center 7.

The operating center 6 and the control center 7 are also connected with one another.

Theoretically, for the detection of the traffic parameters, traditional detectors could be used such as doppler radars and inductive loops. However, to reduce installation troubles and running costs, a new radio-frequency detector has been provided to give a signal whose amplitude is proportional to the detected vehicle's mass and whose length is proportional to the duration of the occupation by the vehicle of the controlled area.

The detector essentially consists of a transmitter 14, which works on a predetermined wave length, preferably comparable to the vehicle size (3 to 4 meters), and of a receiver 15. The transmitter 14 and receiver 15 are placed either on the same side of the road utilizing as the useful signal reflected wave, or facing each other on both sides of the roadway, utilizing as the useful signal the attenuation of the direct wave.

Although the first solution offers a smaller cost of installation, the second turns out to be more reliable since it is less sensitive to disturbances caused by polluting radio frequencies and/or by spurious reflections.

Such arrangements of transmitter 14 and of receiver 15 refer to a one-way road. In the case of a two-way road, like a highway, the detecting stations consists of only one transmitter 14, placed between the two traffic divider guard-rails, and of a pair of receivers 15 placed on the two road sides.

Experience has shown that the optimum distance between two consecutive stations 12, consisting of the transmitter 14 and receiver 15, is of 100 to 200 meters and it depends, on the altimetrical and planimetrical characteristics of the road, as well as on the medium parameters of speed and traffic density, statistically detected in the planning stage.

Figure 5:
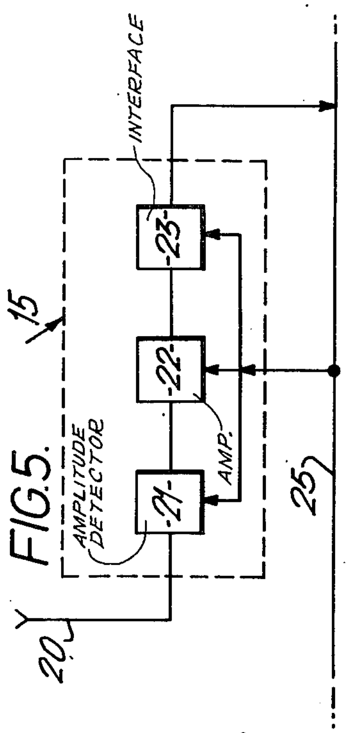
FIG. 5 shows a block diagram of a traffic data receiver.
Figure 4:
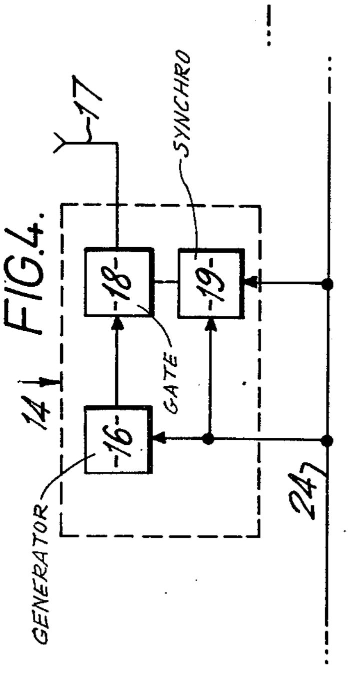
FIG. 4 shows a block diagram of a traffic data transmitter.
Figure 3:
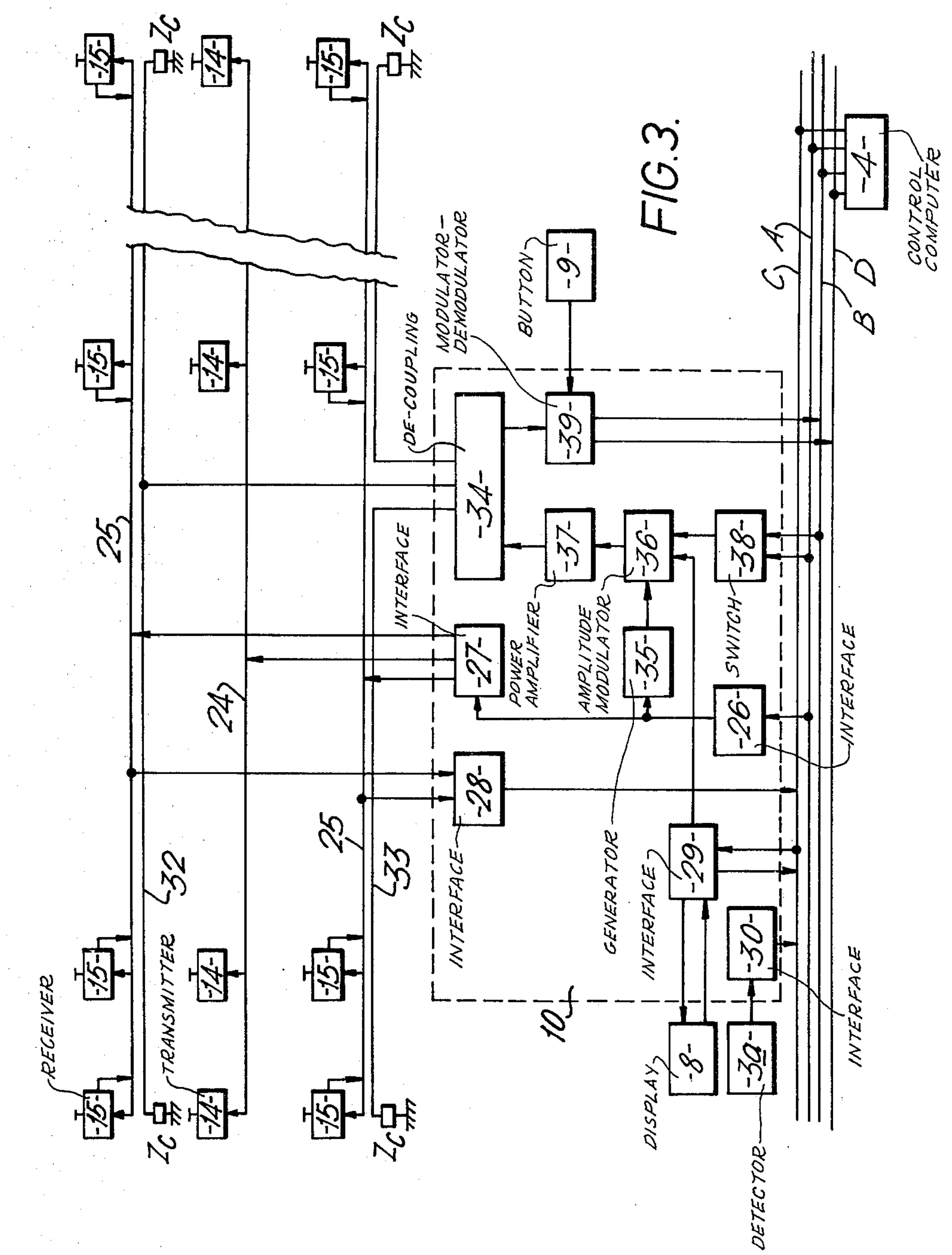
FIG. 3 shows a diagram of devices relative to a post of the layout of FIG. 2.

As shown in FIG. 4, transmitter 14 consists essentially of a telesupplied sinusoidal generator 16 and a radiation antenna 17 activated through a gate circuit 18 synchronously controlled 19 and addressed and activated by the control computer 4. The receiver 15, as shown in FIG. 5, consists of an antenna 20, of an amplitude detector 21 and of a high gain amplifier 22, telesupplied and connected to an interface 23 for the transmission of the useful signal.

Transmitter 14 and receiver 15 are connected respectively to cables 24 and 25. Cable 24 is utilized for the transmission of the synchronization signal and to telesupply the devices. Cable 25 is utilized for the transmission of the detected signal and, for telesupplying the devices.

Cables 24 and 25 are of the double-wire kind, but it is preferable that cable 25 which connects receivers 15 be a coaxial cable, depending on the kind of signal to be transmitted.

The length of cables 24 and 25 is the same as the length of one of the elementary stretches 11 into which the control system is subdivided.

The detection of the traffic parameters is done by broadcasting through the transmitter 14 pulse trains with a prefixed length, controlled by a synchronization signal generated by the control computer 4. The receiver 15, tuned to the transmitter's frequency 14, picks up these signals, detects their level and amplifies it.

The level detected is maximum when the controlled area is in a rest condition (that is when there are no vehicles in transmit or at standstill). Any disturbing event causes an attenuation of the received signal (or an amplification of the reflected wave) proportional with the size of the disturbing units.

The signal of synchronization generated by the computer 4, is picked up by channel A, carried by the telephonic line 13 to post 10 of each elementary stretch and is sent out to the transmitters 14 and to the receivers 15 of each individual stations 12 through an interface for the picking-up of the signal 26 and through a second interface 27 which puts the signal onto the supply line.

The activation of each transmitter 14 and the picking up of the signal by the receiver 15 are carried out in parallel. The activation frequency is such as to allow the identification, by sampling, of the observed phenomenon (the transmit of each vehicle).

The signals coming from the individual detecting stations 12 of each elementary stretch 11 are serially combined in a single message which is sent out to the control computer 4 through an interface of connection 28, utilizing the channel C of the line 13.

The data picked up by the computer 4 is analyzed for the purpose of evaluating the occupation time of each highway stretch and the difference between it and the value forecast on the basis of the data detected in the preceding section. Also parameters are forecast for the following section. Abnormal situations are identified by activating the signals 8 and transmitting the results to the operating center 6 and to the central computer 7.

Each post 10 includes even an interface 29 for the activation and control of the optical signals 8 and, when it is foreseen, an interface 30 for the picking up of the data transmitted by standard meteorological detectors 3*a*.

The interface 29 and the interface 30 are connected to the above mentioned channel A. Interface 29 receives the activation signal and sends out the control signal. Interface 30 transmits the data detected.

Parallel with the cables 25 of each elementary stretch 11, there is provided a radiating system consisting essentially of a transmission line balanced on two wires 32 and 33, terminating in its characteristic impedance $Z_c$. The magnetic field produced turns out to be homogeneous and independent from eventual stations or screens existing between the two roadways, for example the diaphragm separating the two barrel-vaults of a tunnel.

In correspondence with the post 10 of each monitored stretch, both cables 32 and 33 are connected by means of a decoupling device 34 and a receiving-transmitting apparatus. The transmitting part essentially includes a sinusoidal carrier generator 35, controlled in frequency and phase by means of synchronization signals transmitted through the channels A of line 13, through the amplitude modulator 36 and power amplifier 3T, by means of a switch 38, in such a way as to allow the discreteness of the areas concerning the transmission.

The switch 38 connected between the two low-frequency channels A and B is controlled by the computer 4. However, in case of emergency, it is possible to intervene on the base-channel directly from the console of the operating center 6.

The receiving part of the receiving-transmitting apparatus of each post 10, in turn, consists essentially of a modulator-demodulator 39, i.e. modem, which transfers to channel D of the line 13 the picked-up information by means of the above mentioned radiating system as well as the code instructions received from the manual device 9, connected to it.

The transmission in clear is preferably of the inductive kind in order to limit the area of influence to the highway vicinity, in view of the limited transmission power. The coupling 34, which uses the same radiating system for the transmission and for the reception, both in code and in clear, includes filters for the frequencies $f_1$ and $f_2$ used for the two functions and provides separation between the apparatus and the radiating system.

It is to be noticed that the four channels A, B, C, D, can consist of four bi-couples of a telephone cable or can be realized by means of transmission in multiplex which permits carrier frequencies to be borne by the same support. For example, a traditional coaxial cable or a high-frequency bi-couple can be used.

The communications in clear on channels A, B and D go directly to the operating center 6, while the code messages of channel C and those of channel D pass through the control computer 4 and from there go to the control center 7. The subdivision into elementary stretches 11 of the line which supports channels C and D is carried out physically or through radio-frequency filters.

The reception of the transmissions according to the present invention is carried out on board the vehicles, through well known devices tunable on the frequency $f_1$, the only one for the whole network. For example, for the reception of the transmissions in clear, a radio receiver is used with an antenna and fixed tuning on the frequency $f_1$.

For service and/or authorized vehicles there is provided the use of a similarly known apparatus to carry out a two way connection in semiduplex utilizing different frequencies with the same radiating system. For example, $f_1$ for the reception and $f_2$ for the transmission.

These devices allow the connection between the mobile units and the operating center, or vice versa, even in tunnels and in other fading areas not supplied with a radio link. The connection between the operating center and the terminal post of the roadway supplied with the radiating system according to the present invention, can be carried out by using a low-frequency line, for example a telephone line, or a radio link, according to the means locally available.

I claim:

1. An electronic traffic control system for monitoring a stretch of road and permitting two directional transmissions both in code and in clear between an operating center and vehicles located on the stretch of road comprising:

a plurality of detectors positioned in spaced apart relationship along said stretch of road for detecting traffic information and highways conditions;

a plurality of post circuit means, each post circuit means respectively interconnecting a different group of said detectors, each of said post circuit means including means for transmitting and receiving signals from each of the individual detectors constituting that group of detectors;

a radiating system divided into a plurality of sections corresponding in number to the plurality of post circuit means, one section for each of said groups of detectors, said radiating system including a transmission system and receiving and transmitting apparatus positioned respectively in said post circuit means and coupled to said transmission system, a plurality of control computer means, each control computer means respectively interconnecting a different group of post circuit means, each of said control computer means capable of receiving the detected information from each post circuit means within that group of post circuit means and in response thereto calculating the anticipated traffic information at each of the other post circuit means within that group, comparing the anticipated traffic information with the actual detected information at each of the other post circuit means and upon detecting differences greater than predetermined threshold providing an alarm signal;

visual displays positioned along said stretch of road under control of said alarm signal;

signal devices adapted to be inserted within vehicles utilizing said stretch of road and being activated under control of said alarm signal;

each of said control computer means also controlling the sections of said radiating system within that group of post circuit means to transmit in clear prerecorded messages, specific messages both in code and in clear, and broadcast programs;

an operating center coupled to said control computer means for setting the controls desired on the stretch of road;

a central computer interconnecting said control computer means for providing instructions to each of said control computer means concerning said thresholds and other information, and for storing information regarding the performance of each of said control computer means; and a manually operated device attached to each of said post circuit means for transmitting code messages to said operating center.

2. The system as in claim 1, wherein said detectors operate on radio frequency signals, and provide an output signal whose amplitude is proportional to the size of a vehicle detected along said stretch of road and whose length is proportional to the duration of the vehicle's presence along the stretch of road, each of said detectors including a transmitter and a receiver and operating on a predetermined wave length.

3. The system as in claim 2 and wherein said wavelength is approximately the size of a vehicle of about 3 to 4 meters in length.

4. The system as in claim 2 and wherein said transmitter and receiver are both positioned on the same side of the roadway and the receiver picks up a reflected signal from the transmitter.

5. The system as in claim 2 and wherein said transmitter and receiver are positioned on opposite sides of the roadway facing each other and the receiver picks up an attenuated direct wave from the transmitter.

6. The system as in claim 2 and wherein each detector includes a single transmitter positioned centrally in a two-way road, and a pair of receivers positioned on either side of the roadway.

7. The system as in claim 2 and further comprising telephone lines interconnecting each control computer means with its corresponding group of post circuit means, said control computer means providing a synchronization signal onto said telephone line which controls the wavelength of operation of the transmitters and receivers of the detectors, a first interface attached to each post circuit means which interconnects the transmitters of each detector with said telephonic lines to receive the synchronization signal, and asecond interface attached to said post circuit means which interconnects the receivers of each detector with said telephonic lines to couple the detected signal onto the telephonic lines, and wherein the detected signal has a maximum level when there are no vehicles on the stretch of road being monitored and wherein the presence of vehicles causes a modification of the level of the detected signal, the modification being proportional to the size of the vehicle present on the stretch of road.

8. The system as in claim 7, wherein all the transmitters are activated in parallel and all of the receivers detect their respective signals in parallel thereby permitting identification of the detected signals by a sampling process.

9. The system as in claim 7, wherein the detected signals from each individual detector within a group of detectors are serially combined with each other to form a single message, said message being transferred to corresponding control computer means through said telephonic lines, and further comprising third interface means for transferring said single message onto said telephonic lines.

10. The system as in claim 7 and wherein each of said post circuit means further comprises third interface means interconnecting said visual displays with said telephonic lines.

11. The system as in claim 7, wherein at least one post circuit means of each group of post circuit means further comprises meteorological detectors for detecting the meteorological conditions along said stretch of road and third interface means for interconnecting said meteorological detector with said telephonic lines.

12. The system as in claim 7 and wherein said radiating transmission system includes a transmission line balanced on two wires and terminating in its characteristic impedance.

13. The system as in claim 12 and further comprising decoupling means connected between each pair of said transmission wires and said receiving and transmitting apparatus attached to the post circuit means, said decoupling means permitting the utilization of the same radiating system for both transmission as well as reception of signals both in code and in clear, and further comprising at least two filters each for a different frequency wherein one is used for transmission and the other for reception, and for providing isolation between the said receiving and transmitting apparatus and said radiating system.

14. The system as in claim 13 and wherein said transmission in clear is of an inductive kind.

15. The system as in claim 13, wherein the transmitting part of said receiving and transmitting apparatus comprises, a sinusoidal carrier generator whose frequency and phase are controlled by synchronization signals from said telephone lines, an amplitude modulator coupled to said generator, a power amplifier coupled to said amplitude modulator, said power amplifier being controlled by a first and second channel of said telephonic lines, switch means connected between said telephonic lines and said power amplifier to select one of said two channels to thereby allow discrete areas of transmission, said switch being operated by the corresponding control computer means and by said operating center; and wherein the receiving part of said receiving and transmitting apparatus comprises a modem for transferring onto a third and fourth channel of said telephonic lines information detected by said radiating system and instructions from said manually operated device.

16. The system as in claim 15, wherein the communications in clear on the first, second and fourth channels of said telephonic lines go directly to said operating center and wherein the code messages of the third channel and the code messages of the fourth channel go to the corresponding control computer means.

17. The system as in claim 15 and wherein the channels of said telephonic lines consist of double-wire telephonic cable.

18. The system as in claim 15 and wherein the channels are formed through a multiplexing transmission system.

19. The system as in claim 15 and wherein at least some of the channels are formed of double-wire telephonic cable, and the rest of the channels are formed by a multiplexing transmission system.

20. The system as in claim 1 and wherein the spacing between adjacent detectors is dependent upon the configuration of the roadway, and the speed and density of traffic to be carried on the roadway.

21. The system as in claim 20 and wherein the spacing between adjacent detectors is between 100 and 200 meters.

22. The system as in claim 1 and wherein each of said detectors includes a transmitter comprising a sinusoidal generator, an antenna for sending out signals, a gating circuit interconnecting said sinusoidal generator and said antenna, a synchronization circuit controlling the operation of said gating circuit and activated by the corresponding control computer means, and a receiver comprising an antenna for receiving the signals from the transmitter, an amplitude detector connected to the antenna, a high gain amplifier connected to the amplitude detector and interface means connected to the amplifier and capable of sending out the detected signals, transmitter cables respectively interconnecting the transmitters within each group of detectors for supplying to each transmitter synchronization signals, and receiver cables respectively interconnecting the receivers within each group of detectors for obtaining the detected signals.

23. The system as in claim 22 and wherein said transmitting and receiving cables are double-wire cables.

24. The system as in claim 22 and wherein said transmitting and receiving cables are coaxial cables.

* * * * *